US012169056B2

(12) United States Patent
Fox et al.

(10) Patent No.: US 12,169,056 B2
(45) Date of Patent: Dec. 17, 2024

(54) RAILROAD CROSSING GATE LAMP SYSTEM

(71) Applicant: Railway Equipment Company, Inc., Minneapolis, MN (US)

(72) Inventors: David K. Fox, Minneapolis, MN (US); Benjamin Moulton, Minneapolis, MN (US); Randall G. Honeck, Minneapolis, MN (US); Greggory C. Phelps, Minneapolis, MN (US)

(73) Assignee: RAILWAY EQUIPMENT COMPANY, Minneapolis, MN (US)

( * ) Notice: Subject to any disclaimer, the term of this patent is extended or adjusted under 35 U.S.C. 154(b) by 960 days.

(21) Appl. No.: 17/108,204

(22) Filed: Dec. 1, 2020

(65) Prior Publication Data

US 2021/0190300 A1 Jun. 24, 2021

Related U.S. Application Data

(63) Continuation of application No. 15/872,461, filed on Jan. 16, 2018, now Pat. No. 10,883,705.

(Continued)

(51) Int. Cl.

*F21V 21/002* (2006.01)
*B61L 29/04* (2006.01)

(Continued)

(52) U.S. Cl.

CPC ........... *F21V 21/002* (2013.01); *B61L 29/04* (2013.01); *B61L 29/22* (2013.01); *B61L 29/28* (2013.01); *F21V 21/116* (2013.01); *F21V 23/002* (2013.01); *F21V 23/06* (2013.01); *H01R 4/2406* (2018.01); *H01R 13/622* (2013.01); *B61L 2207/02* (2013.01); *F21W 2111/02* (2013.01); *H01R 4/26* (2013.01); *H01R 13/5804* (2013.01); *H01R 24/86* (2013.01); *H01R 2105/00* (2013.01)

(58) Field of Classification Search

CPC .......... B61L 29/04; B61L 29/08; B61L 29/22; B61L 29/28; B61L 2207/02; F21V 21/002; F21V 21/116; F21V 23/002; F21V 21/005; F21V 23/06; H01R 4/2406; H01R 4/26; H01R 13/5804; H01R 24/86; H01R 2105/00; F21W 2111/02

See application file for complete search history.

(56) References Cited

U.S. PATENT DOCUMENTS 494,390 A 3/1893 Smith
516,049 A 3/1894 Harden (Continued)

FOREIGN PATENT DOCUMENTS

DE 2451743 A1 5/1976
DE 10020191 C2 * 3/2003 ........... H01R 4/2404

(Continued)

*Primary Examiner* — Zachary L Kuhfuss
*Assistant Examiner* — Chen Lin
(74) *Attorney, Agent, or Firm* — Merchant & Gould P.C.

(57) ABSTRACT

The present disclosure provides a new gate lamp system and method. The system and method is configured to facilitate the installation of a gate lamp onto a gate arm, and to facilitate the replacement of one or more of the gate lamps. The present disclosure provides a system and method of installing gate lamps on a gate arm in the field in a robust manner with ease.

13 Claims, 16 Drawing Sheets

Related U.S. Application Data

(60) Provisional application No. 62/445,794, filed on Jan. 13, 2017.

(51) Int. Cl.

| | |
|---|---|
| ***B61L 29/22*** | (2006.01) |
| ***B61L 29/28*** | (2006.01) |
| ***F21V 21/116*** | (2006.01) |
| ***F21V 23/00*** | (2015.01) |
| ***F21V 23/06*** | (2006.01) |
| ***H01R 4/2406*** | (2018.01) |
| ***H01R 13/622*** | (2006.01) |
| *F21W 111/02* | (2006.01) |
| *H01R 4/26* | (2006.01) |
| *H01R 13/58* | (2006.01) |
| *H01R 24/86* | (2011.01) |
| *H01R 105/00* | (2006.01) |

(56) References Cited

U.S. PATENT DOCUMENTS

| | | | | | |
|---|---|---|---|---|---|
| 545,701 | A | | 9/1895 | Lattig | |
| 752,959 | A | | 2/1904 | Currier | |
| 913,974 | A | | 3/1909 | Pettey | |
| 1,211,676 | A | | 1/1917 | Coleman | |
| 1,818,625 | A | | 8/1931 | Hunter | |
| 2,386,161 | A | | 10/1945 | Hawes | |
| 2,598,196 | A | | 5/1952 | Staley | |
| 2,792,559 | A | | 5/1957 | Maberry | |
| 3,036,146 | A | | 5/1962 | Kamen | |
| 3,251,069 | A | | 5/1966 | Clark | |
| 3,538,484 | A | | 11/1970 | Passafiume | |
| 3,964,704 | A | | 6/1976 | Karr | |
| 3,994,457 | A | | 11/1976 | Teasel | |
| 4,053,760 | A | | 10/1977 | Glazier | |
| 4,067,523 | A | | 1/1978 | Kenny | |
| 4,068,966 | A | | 1/1978 | Johnson | |
| 4,186,429 | A | | 1/1980 | Johnston | |
| 4,449,168 | A | | 5/1984 | Ewing | |
| 4,460,811 | A | | 7/1984 | Murr | |
| 4,523,256 | A | | 6/1985 | Small | |
| 4,666,108 | A | | 5/1987 | Fox | |
| 4,784,356 | A | * | 11/1988 | Fox | B61L 29/04 248/228.6 |
| 5,321,593 | A | * | 6/1994 | Moates | F21S 10/00 439/111 |
| 6,935,885 | B2 | * | 8/2005 | Scherer | H01R 24/70 439/417 |
| 7,075,427 | B1 | | 7/2006 | Pace et al. | |
| 7,425,153 | B1 | * | 9/2008 | Miller | H01R 9/0524 439/669 |
| 7,794,132 | B2 | * | 9/2010 | Cunius | F21V 21/002 362/241 |
| 9,272,721 | B2 | | 3/2016 | Bohme | |
| 9,701,328 | B2 | | 7/2017 | Martin | |
| 10,883,705 | B2 | | 1/2021 | Fox et al. | |
| 2005/0284987 | A1 | | 12/2005 | Kandle | |
| 2009/0007661 | A1 | | 1/2009 | Nasiri | |
| 2009/0194642 | A1 | | 8/2009 | Honeck | |
| 2014/0028289 | A1 | | 1/2014 | Ohnemus | |
| 2018/0202636 | A1 | | 7/2018 | Fox | |

FOREIGN PATENT DOCUMENTS

| | | | | | |
|---|---|---|---|---|---|
| EP | 1710491 | A2 | * | 10/2006 | F21S 8/068 |
| FR | 0715690 | A | | 12/1931 | |
| FR | 993578 | A | | 11/1951 | |
| GB | 0324007 | A | | 1/1930 | |
| GB | 0701030 | A | | 12/1953 | |
| GB | 1480992 | A | | 10/1975 | |

* cited by examiner

RAILROAD CROSSING GATE LAMP SYSTEM

CROSS-REFERENCE TO RELATED APPLICATION

This application is a continuation of application Ser. No. 15/872,461 filed Jan. 16, 2018, now U.S. Pat. No. 10,883,705, which application claims the benefit of U.S. Patent Application Ser. No. 62/445,794, filed Jan. 13, 2017, the disclosures of which are hereby incorporated by reference in their entireties.

BACKGROUND

Railroad crossing arms are in widespread use as traffic barriers at railroad road crossings. The crossing arms are normally positioned upright and are lowered to a horizontal position when an approaching train is detected. The crossing arms of railroad crossing gates are typically provided with various signal lights that are secured to the crossing arm.

Conventionally, three signal lights are used. A first light is disposed at the far end of the crossing arm. The remaining two lights are generally spaced along the crossing arm. It is conventional that the lights be incorporated into an electrical circuit such that the light at the far end is constantly illuminated when the crossing arm is in its horizontal position. The remaining signal lights are configured such that they alternately flash off and on. Other configurations have also been used.

The environments in which railroad crossing gates are employed are often harsh. Therefore, from time to time the gate lamps need to be replaced due to damage to the lamps and or damage to the gate arm itself. There is a need for gate lamp systems that are robust, modular, and easy and efficient to install.

SUMMARY

The present disclosure provides a new gate lamp system and method. The system and method is configured to facilitate the installation of the gate lamp onto a gate arm and to facilitate the replacement of one or more of the gate lamps. The present disclosure provides a system and method of installing gate lamps on a gate arm in the field in a robust manner with relative ease.

DETAILED DESCRIPTION

Figure 1:
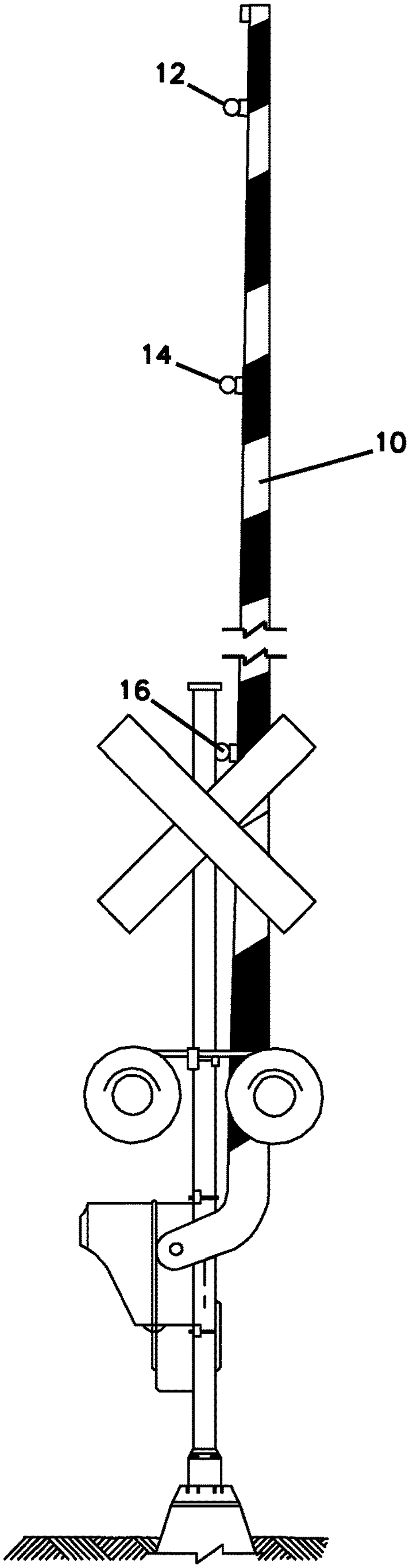
FIG. 1 is an illustration of a gate arm with a number of gate lamps mounted thereon.

Referring to the FIGS. generally, the present disclosure is described in further detail below. FIG. 1 illustrates an example cross gate arm. As is typical, the gate includes an arm 10 that pivots from a generally vertical position (as shown) to a generally horizontal position. The arm typically includes a plurality of lamps 12, 14, and 16 mounted thereon. Typically the gates include three lamps. When a train is near the distal lamp 12, the lamp lights up and stays on whereas the middle lamp 14 and the proximal lamp 16 flash in an alternating sequence. It should be appreciated that many other alternative configurations are also possible.

In the depicted embodiment, the lamps 12, 14 and 16 are EZ Gate® LED Lamps with Light Out Detection (LOD). They are railroad crossing gate arm lamps that adjust their operating current based on whether or not the lamp illuminates. The purpose of such lamps 12, 14 and 16 is to provide light at the gate arm 10 and to provide electrical feedback of their state of illumination. It should be understood that although in the depicted embodiment the lamps are EZ Gate® LED lamps with Light Out Detection, the lamps 12, 14 and 16 could alternatively be any other type of light emitting diodes (LED) or a non-LED lamp such as an ordinary incandescent bulb. It should be appreciated that the terms "lamp" and "light" are used interchangeably herein.

Figure 2:
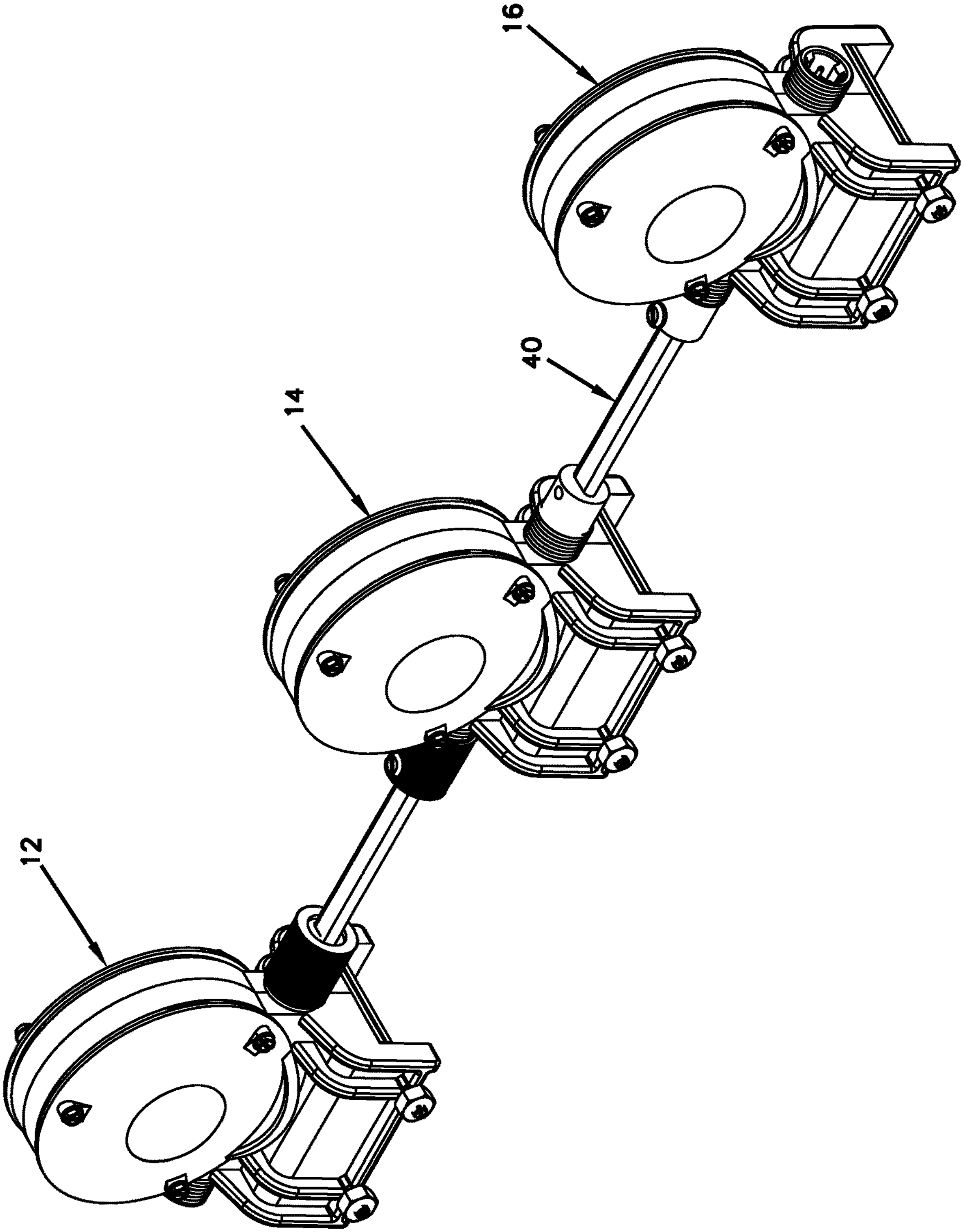
FIG. 2 is a top isometric view of three gate lamps electrically connected to each other according to the principles of the present disclosure.
Figure 3:
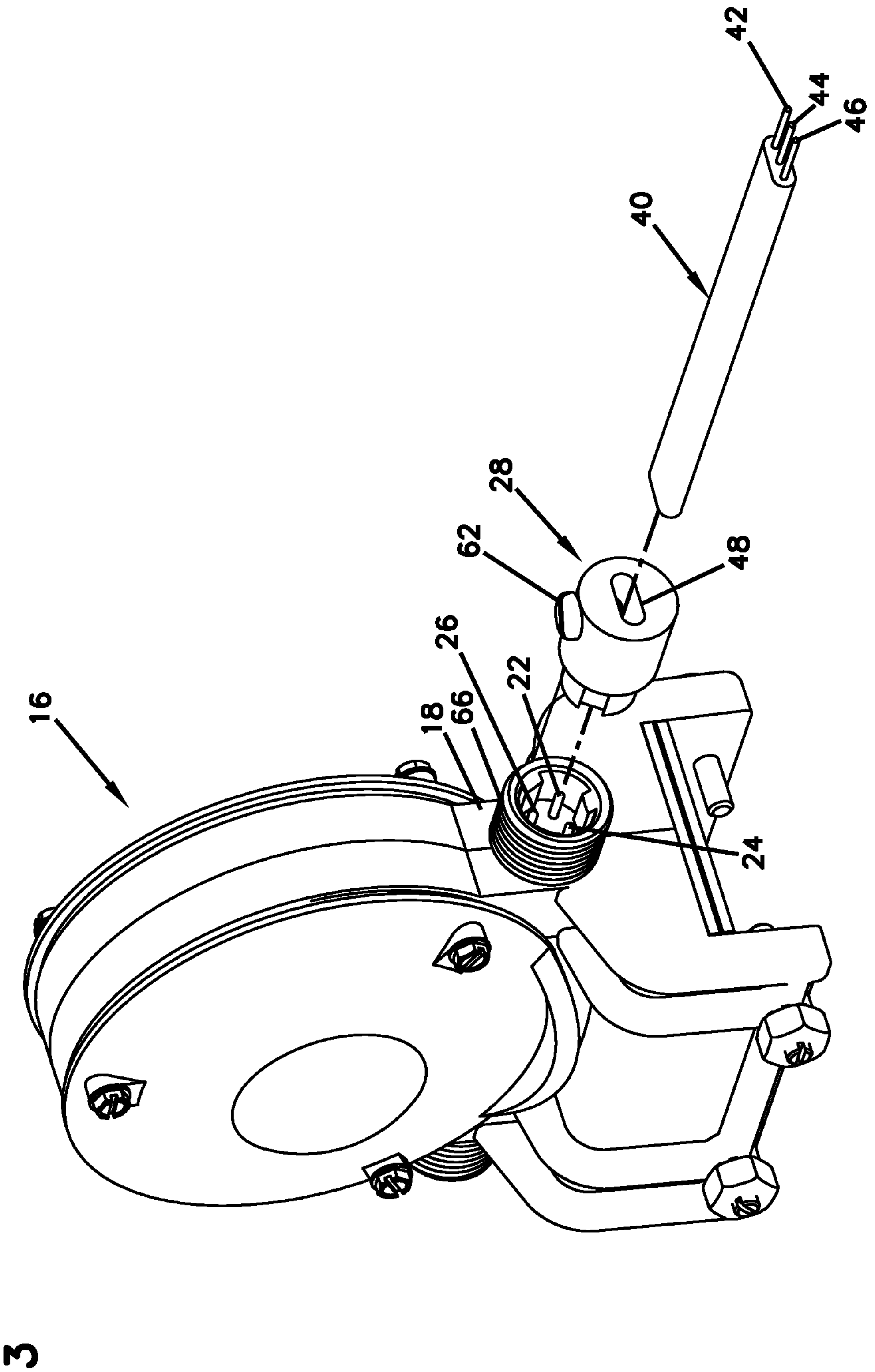
FIG. 3 is an exploded isometric view of a portion of FIG. 2.
Figure 4:
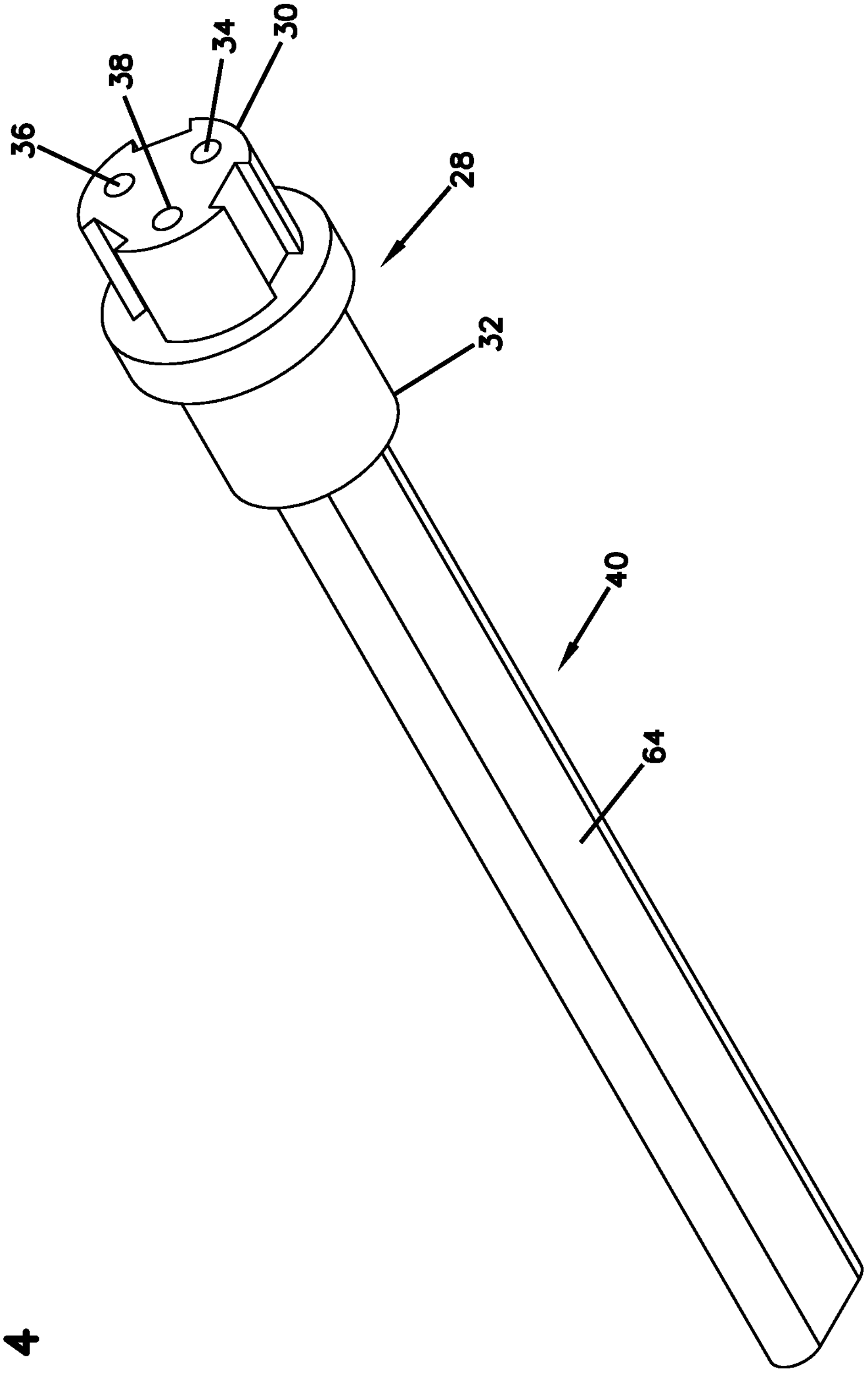
FIG. 4 is a front isometric view of the assembled connector and cord of FIG. 3.
Figure 5:
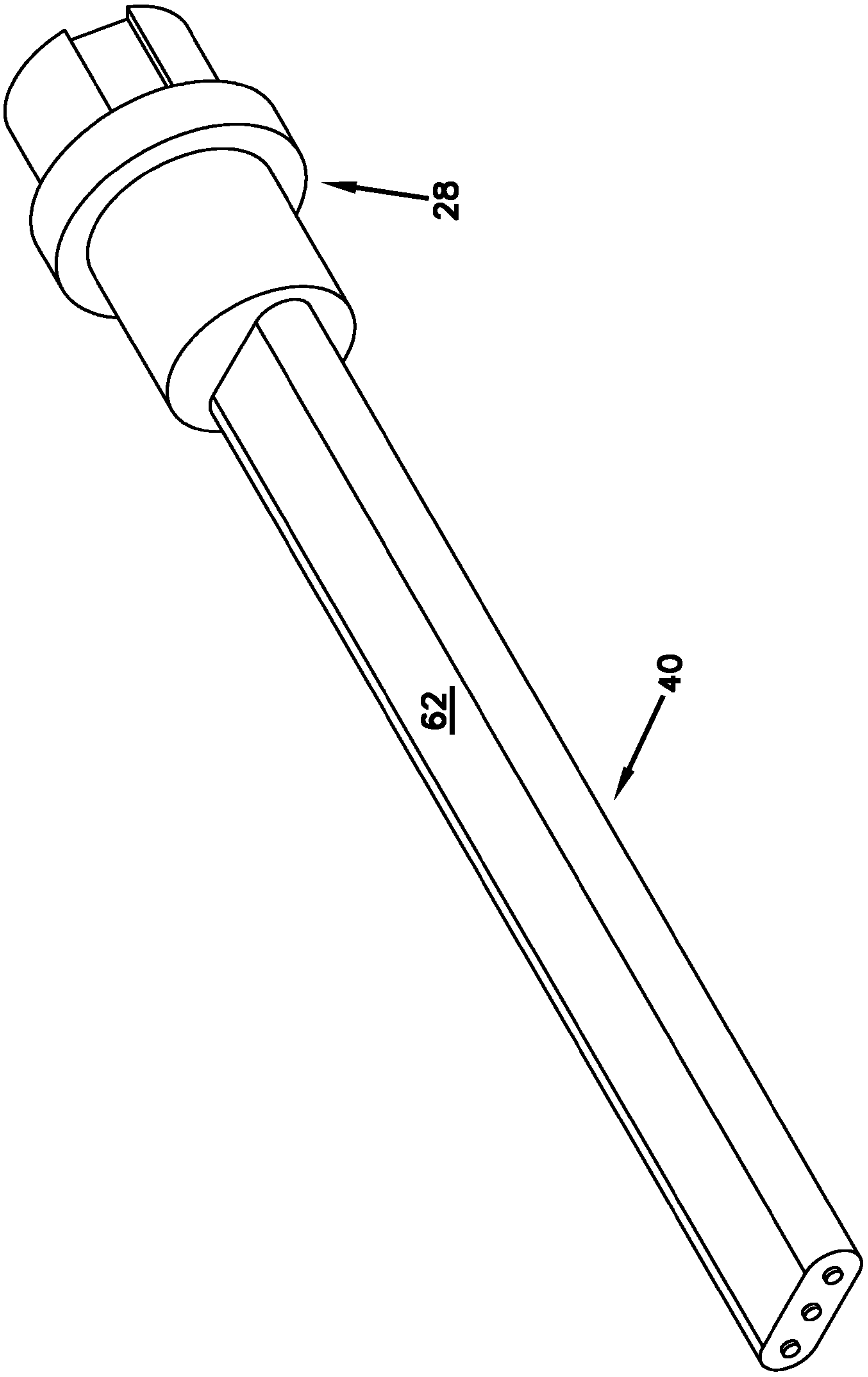
FIG. 5 is a rear isometric view of the assembled connector and cord of FIG. 3.
Figure 6:
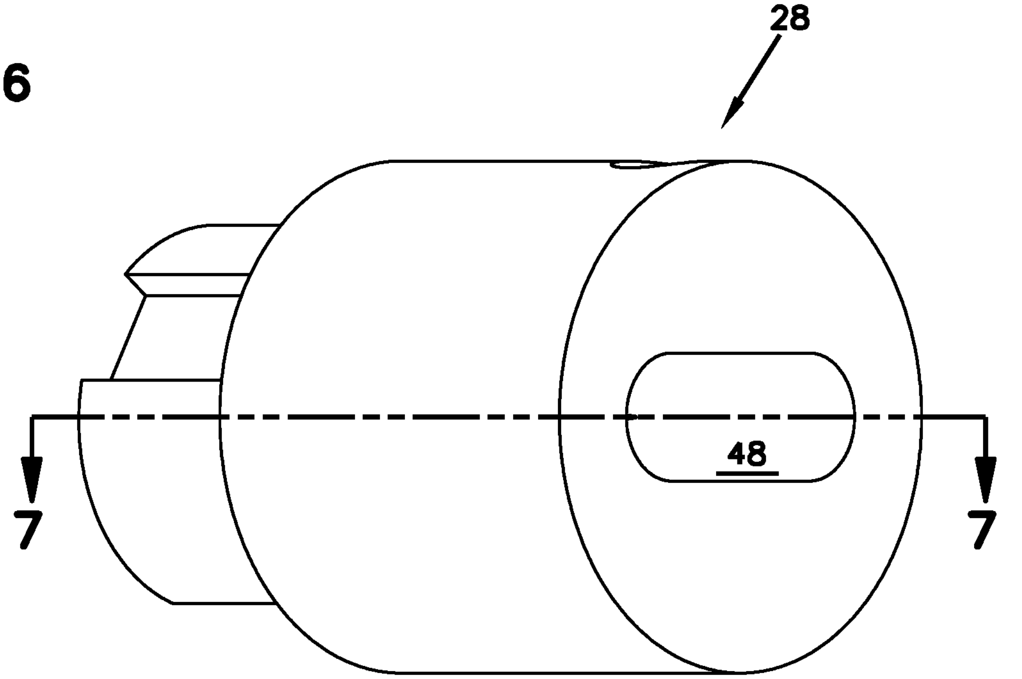
FIG. 6 is a rear isometric view of a connector of FIG. 3.
Figure 7:
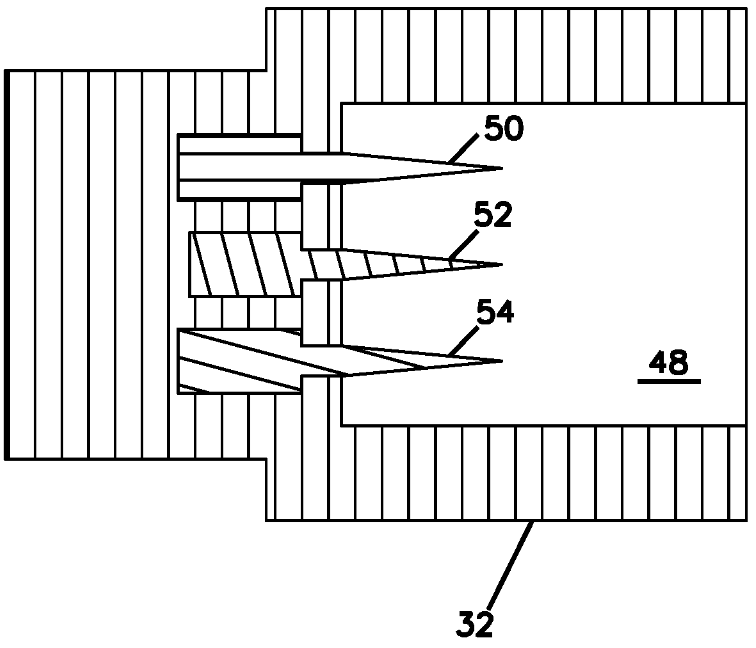
FIG. 7 is a cross sectional view of the connector of FIG. 4 along lines 4-4.
Figure 8:
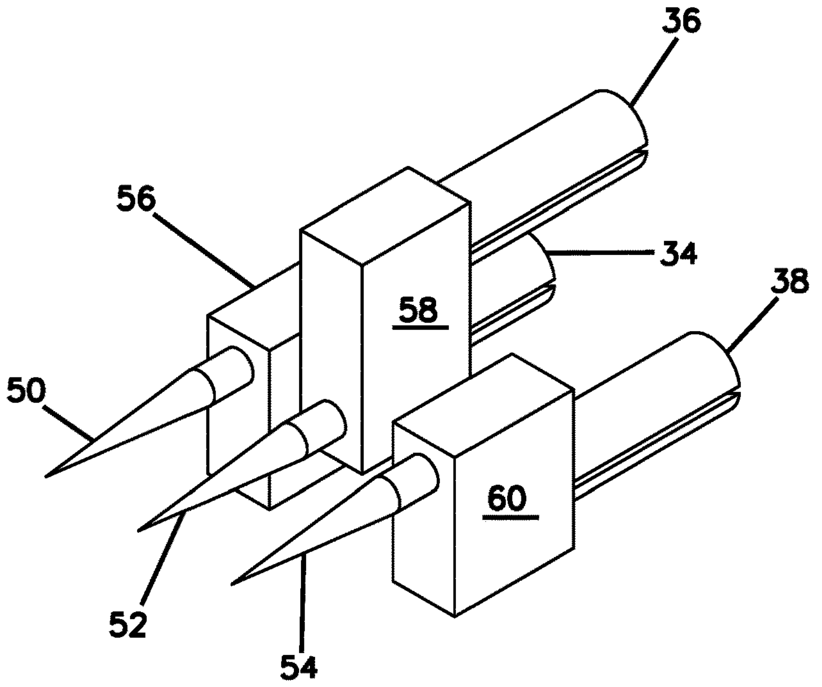
FIG. 8 is a front isometric view of the conductive components within the connector of FIG. 4 with the insulated housing removed.

Referring to FIG. 2, in the depicted embodiment the lamps 12, 14, 16 are identical and interchangeable. In the depicted embodiment, what determines whether the particular lamp stays on or flashing according to a particular timing is based on how the lamp is connected and/or configured. Accordingly, only one of the lamps 12, 14, 16 will be described in further detail below.

Referring generally to FIGS. 2-11, in the depicted embodiment, the gate lamp 16 includes a lower body portion 18 that is configured to mount to a crossing gate arm 10. In the depicted embodiment, the lower body portion 18 defines a channel in which can be fitted over the upper edge of a gate arm 10 and screwed, bolted, or clamped to the upper edge of the gate arm 10. In the depicted embodiment, the lower body portion 18 also includes a plug portion 20. The plug portion 20 includes at least a first conductive prong 22, a second conductive prong 24, and a third conductive prong 26. It should be appreciated that many other alternative configurations are also possible.

In the depicted embodiment, the gate lamp system includes a connector 28 including a first end 30 that is configured to mate with the plug portion 20 of the gate lamp 16. In the depicted embodiment, the first end 30 of the connector 28 includes a first conductive receptacle 34, a second conductive receptacle 36, and a third conductive receptacle 38. In the depicted embodiment, the connector 28 is a multi-position connector. In particular, the rotational orientation of the first end 30 of the connector 28 relative to the plug 20 dictates which conductive receptacles 34, 36, 38 receive which conductive prongs 22, 24, 26. In the depicted embodiment, depending on the rotational orientation of the connector 28 and plug 20, the lamp 16 can be made to stay on when a train is approaching, flash at a first timing sequence, or flash at a second timing sequence. It should be appreciated that many other alternative configurations are also possible.

In the depicted embodiment, the system includes an electrical cord 40 having a non-circular outer profile (e.g., a flat cord as shown). In the depicted embodiment, the electrical cord 40 includes a first conductor 42, a second conductor 44, and a third conductor 46 therein. In the depicted embodiment, each of the first, second, and third conductors 42, 44, 46 are electrically insulated from each other with a known predefined location within the electrical cord 40. It should be appreciated that the terms "cord" and "cable" are used interchangeably herein. Also it should be appreciated that the electrical cord 40 and conductors 42, 44, 46 can be used to deliver power and/or a control signal. It should be appreciated that many other alternative configurations are also possible.

In the depicted embodiment, the electrical cord 40 is connected to a second end 32 of the connector 28 such that the first conductor 42 of the electrical cord 40 is electrically connected to the first conductive receptacle 34, the second conductor 44 of the electrical cord 40 is electrically connected to the second conductive receptacle 36, the third conductor 46 of the electrical cord 40 is electrically connected to the third conductive receptacle 38. It should be appreciated that many other alternative configurations are also possible. For example, the connector 28 can be rotated relative to the plug 20 to align different conductors with different receptacles.

In the depicted embodiment, the second end 32 of the connector 28 includes an opening 48 that is shaped to axially receive and guide the electrical cord 40 into electrical engagement with conductors within the second end 32 of the connector 28. In the depicted embodiment, the shape of the opening 48 matches the shape of the external profile of the cord 40. In some embodiments, the opening 48 is tapered to facilitate insertion of the electrical cord 40. It should be appreciated that many other alternative configurations are also possible.

In the depicted embodiments, the conductors within the second end 32 of the connector 28 include a first conductive spear 50 that is configured and arranged to axially extend into the first conductor 42 of the electrical cord 40, a second conductive spear 52 that is configured and arranged to axially extend into the second conductor 44 of the electrical cord 40, and a third conductive spear 54 that is configured and arranged to axially extend into the third conductor 46 of the electrical cord 40. In the depicted embodiment, the act of extending the conductive spears 50, 52, 54 into the conductor 42, 44, 46 enables electrical connection between the two components. In the depicted embodiment, the spears 50, 52, 54 are conical in shape and displace the conductor 42, 44, 46 radially as the spear 50, 52, 54 is driving axially into the end of the conductor 42, 44, 46. It should be appreciated that many other alternative configurations are also possible.

In the depicted embodiment, a first conductive body 56 connects the first conductive spear 50 to the first conductive receptacle 34. A second conductive body 58 connects the second conductive spear 52 to the second conductive receptacle 36. A third conductive body 60 connects the third conductive spear 54 to the third conductive receptacle 38. In the depicted embodiment, the spear 50, 52, 54, the conductive body 56, 58, 60, and the receptacle 34, 36, 38 are integrally formed of a conductive material (e.g., copper, brass, etc.). In the depicted embodiment, the body portions 56, 58, 60 that connect the spears 50, 52, 54 to the receptacle 34, 36, 38 share the same structure which can facilitate their manufacturing of the connector. It should be appreciated that many other alternative configurations are also possible.

Figure 19:
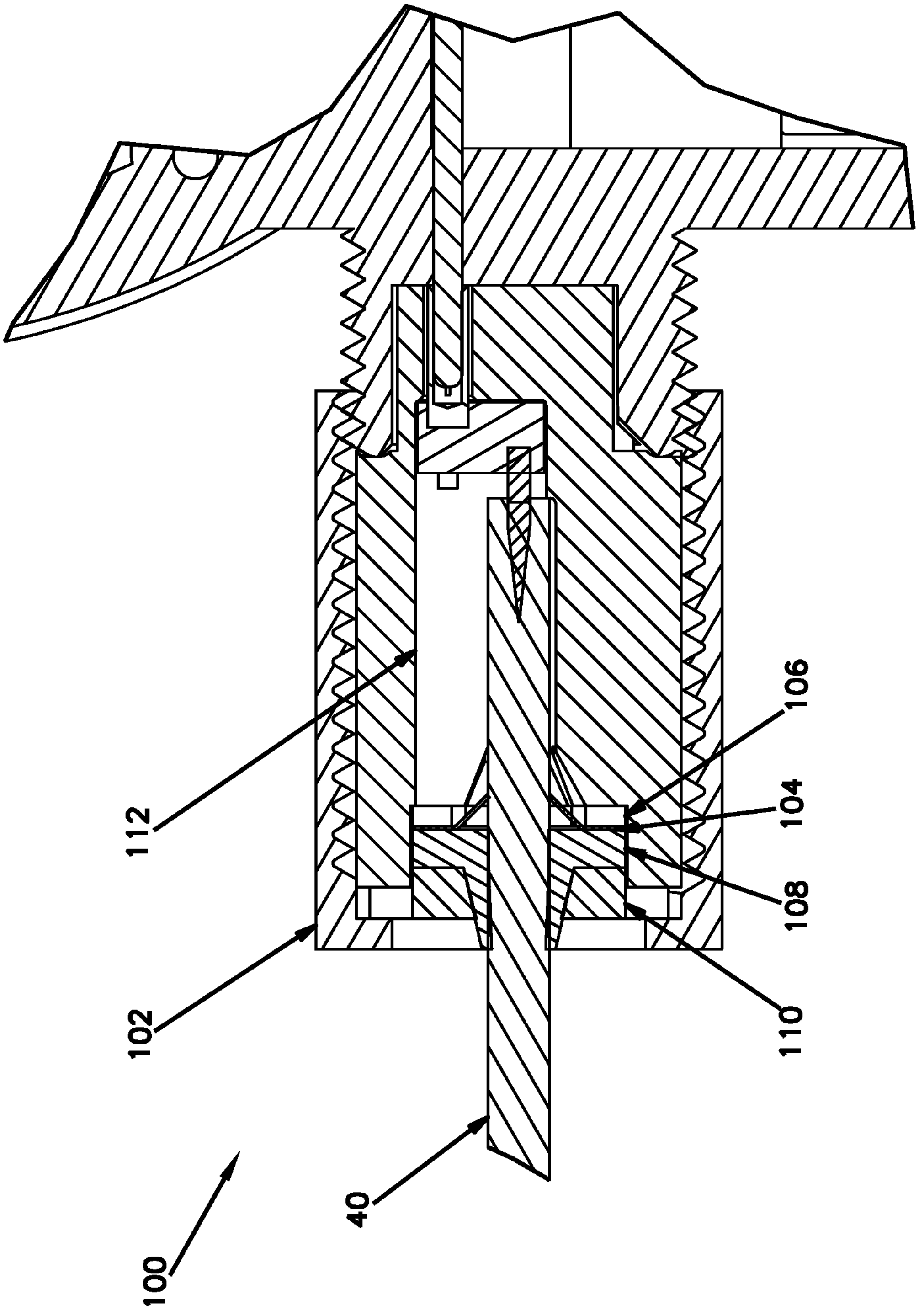
FIG. 19 is a cross sectional view of an alternative embodiment of the connector of FIG. 2.
Figure 20:
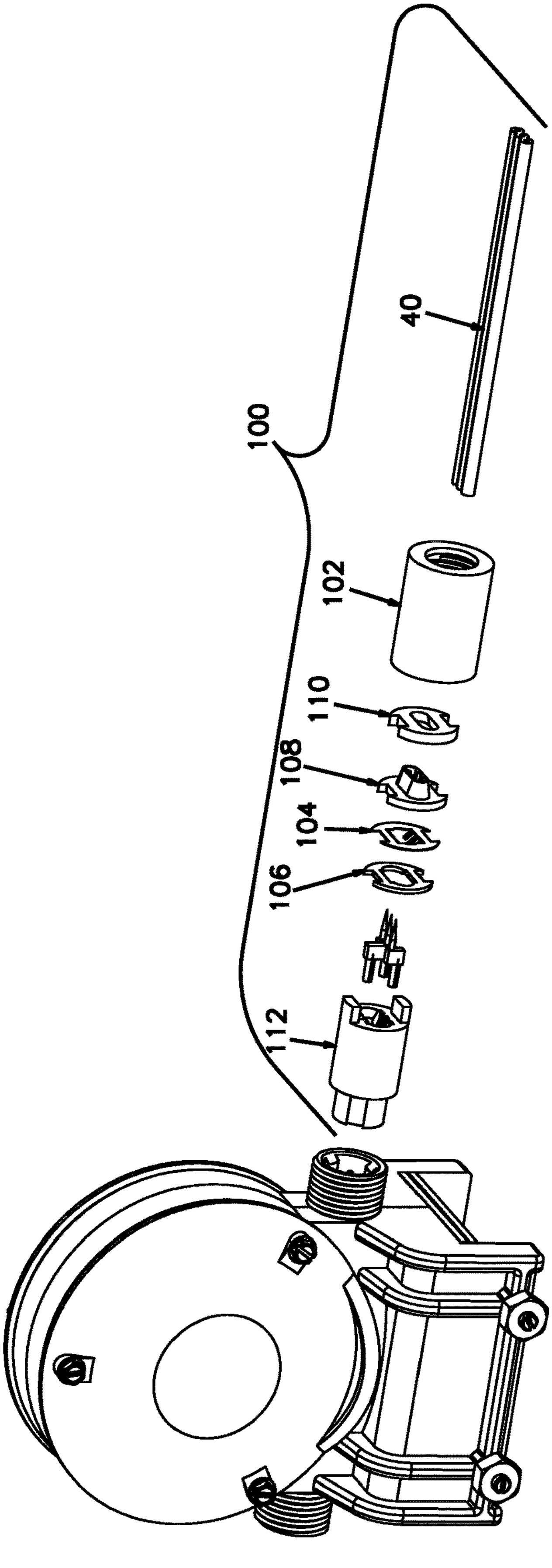
FIG. 20 is an exploded assembly view of the connector of FIG. 19.

In the depicted embodiment, the connector 28 is configured to receive a set screw 62 that is configured to secure the electrical cord 40 within the second end 32 of the connector 28. It should be appreciated that many other alternative configurations are also possible. For example, the connector 28 can be configured to clamp the end of the cord 40 in place and/or the cord 40 can be potted in place with an adhesive. Referring generally to FIGS. 19-20, an alternative embodiment of the connector 28 that secures the electrical cord 40 differently is described. The first end of the connector 100 shares the same features and the first end of the connector 28. However, the second end of the connector 100 is different than the second end 32 of the connector 28 in that the second end of the connector 100 is configured to secure the electrical cord 40 via a self-locking strain relief system.

In the depicted embodiment, the electrical cord 40 is connected to the gate lamp by pushing the cord 40 into engagement with the spears 50, 52, 54 at the second end of the connector 100 and then tightening the retaining collar 102. The act of pushing the cord 40 into engagement with the spears 50, 52, 54 deflects the cable grip plug 104 and causes it to grab the sheathing of the cable to prevent it from being pulled outwardly. In the depicted embodiment, the cable grip plug 104 is a thin sheet of steel with feet that deflect and bite into the cable sheathing. The distance between the teeth and the upper edge of the cable opening is substantially larger than the diameter of the conductors in the electrical cord 40. The axial location of the cable grip plug 104 is positioned to prevent shorting of the cable (i.e., the teeth are configured to not be able to contact the conductors in the cord 40.

In the depicted embodiment, the connector 100 is weatherproof (waterproof). In the depicted embodiment, the second end of the connector 100 includes a first seal 106, a second seal 108, and a washer 110. When the collar 102 is tightened, the seals 106, 108 are compressed and deform, thereby preventing moisture from permeating the connection between the connector body and the electrical cord. In the depicted embodiment, the first seal 106 includes assistive on both primary surfaces, and the second seal 108 is comprised of a soft resilient material (e.g., rubber). In the depicted embodiment, the cable grip plug 104, the first and second seals 106, 108 and the washer 110 all include upper and lower locator notches that align with the outwardly extending tab of the connector body 112. This configuration prevents these internal components from rotating as the collar 102 is tightened.

Figure 9:
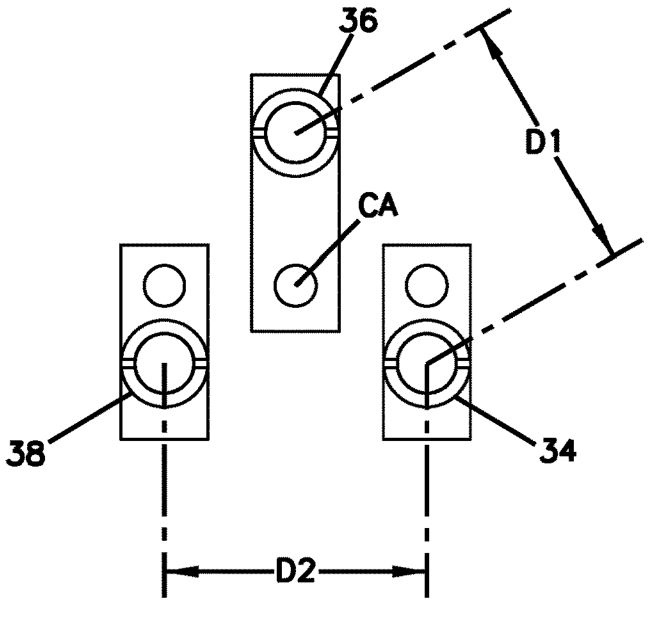
FIG. 9 is a rear end view of the conductive components of FIG. 8.
Figure 10:
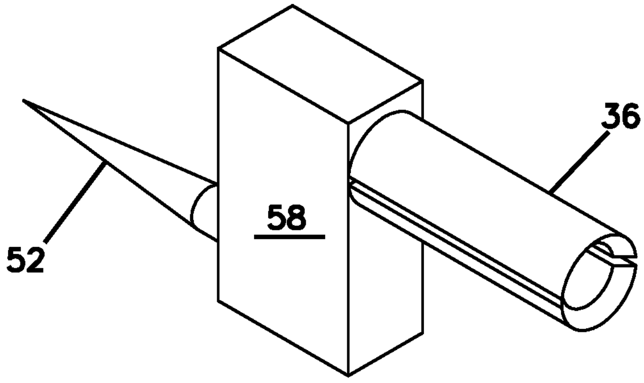
FIG. 10 is an isometric view of a single conductive component of the connector of FIG. 4.
Figure 11:
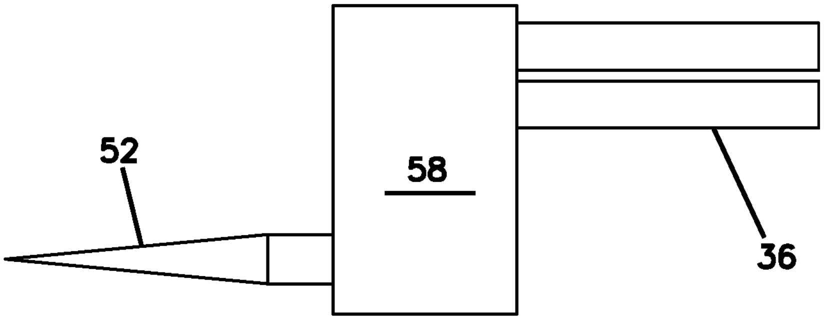
FIG. 11 is a side view of the conductive component of FIG. 10.

Referring particularly to FIG. 9, in the depicted embodiment, the first conductive receptacle 34, the second conductive receptacle 36, and the third conductive receptacle 38, are spaced apart and positioned equal distance from a central axis CA of the connector 28. In the depicted embodiment, the distance D1 between the first conductive receptacle 34 and the second conductive receptacle 36 is the same as the distance D2 between the first conductive receptacle 34 and the third conductive receptacle 38. In the depicted embodiment, the receptacles 34, 36, 38 are positioned 120 degrees relative to each other. It should be appreciated that many other alternative configurations are also possible.

In the depicted embodiment, the electrical cord 40 includes a generally flat top periphery portion 62 and a generally flat bottom periphery portion 64. In the depicted embodiment, the first conductor 42, the second conductor 44, and the third conductor 46 of the electrical cord 40 are arranged linearly with the body of the cord 40. Likewise, the spears 50, 52, 54 are also arranged linearly in a row so that they axially align with the conductors 42, 44, 46 in the cord 40. In the depicted embodiment, the plug 20 includes a cylindrical housing defining a recess wherein the first, second, and third prongs 22, 24, 26 are located. The outer surface 66 of the cylindrical housing is threaded. In the depicted embodiment, the cylindrical body of the connector 28 includes an annual flange 78 located between the first and second end of the connector 30, 32. In the depicted embodiment, a cap engages the annular flange 78 configured to engage the threads 66 to secure the connector to the plug 20. It should be appreciated that many other alternative configurations are also possible.

In the depicted embodiment, the system includes an inline connector 68 comprising a first end 70 and a second end 72. In the depicted embodiment, each end is configured to axially receive and secure a distal end of an electrical cord 74, 76. The inline connector 68 can facilitate installation of a lamp system where the connector and cord are pre-connected. It should be appreciated that many other alternative configurations are also possible.

Figure 12:
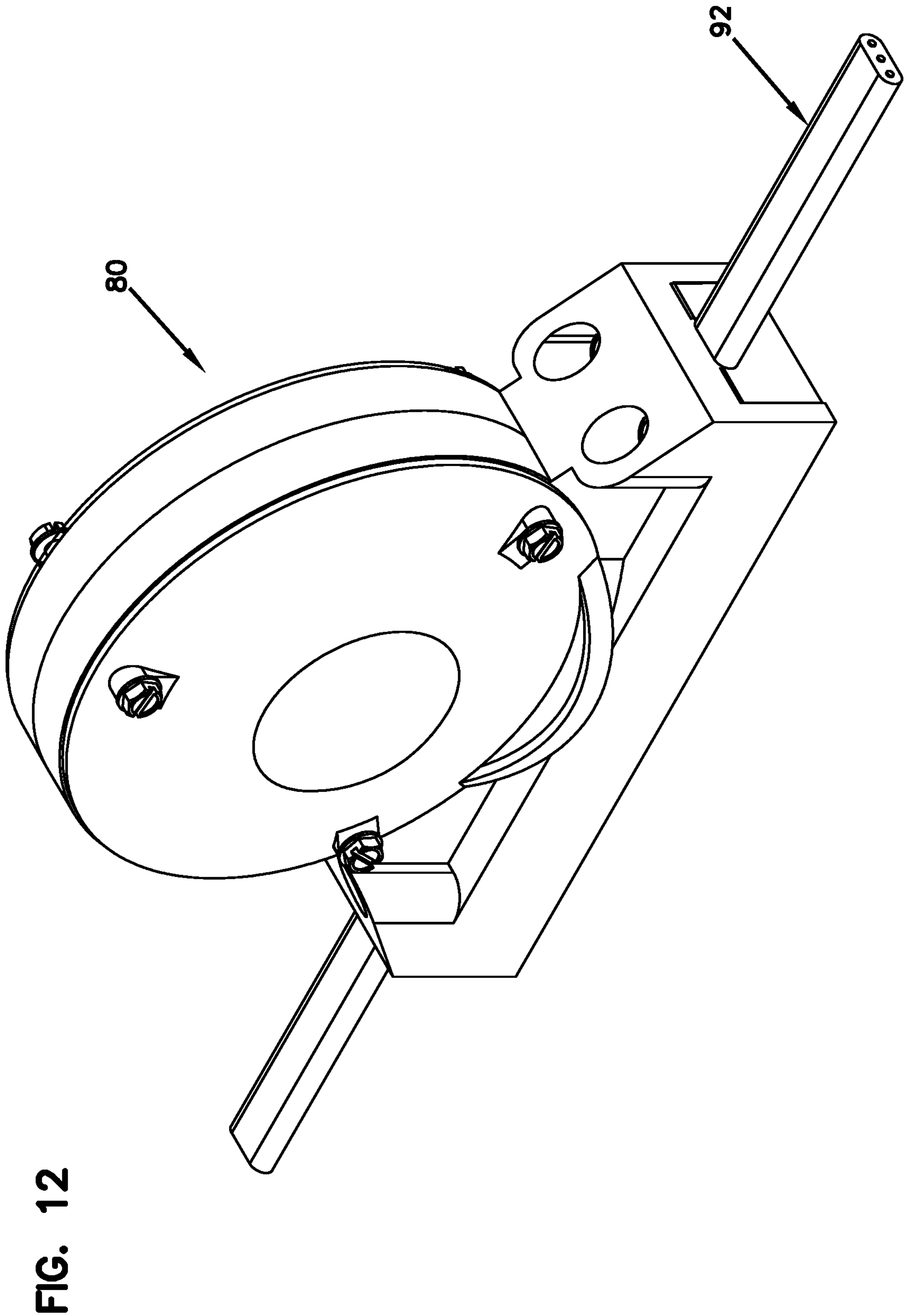
FIG. 12 is an isometric view of an alternative embodiment of the gate lamp of FIG. 2.
Figure 13:
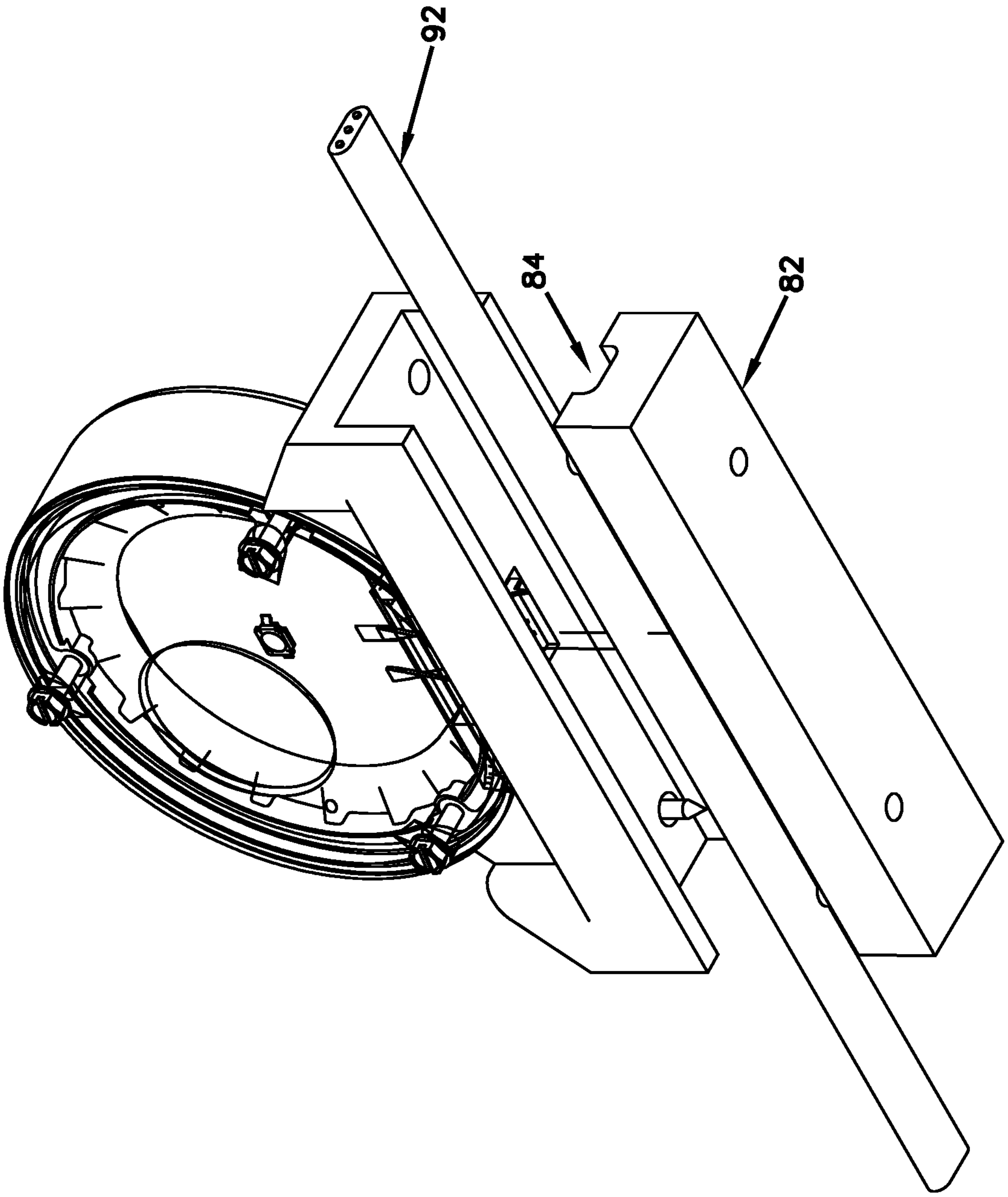
FIG. 13 is an exploded view of the gate lamp of FIG. 12.
Figure 14:
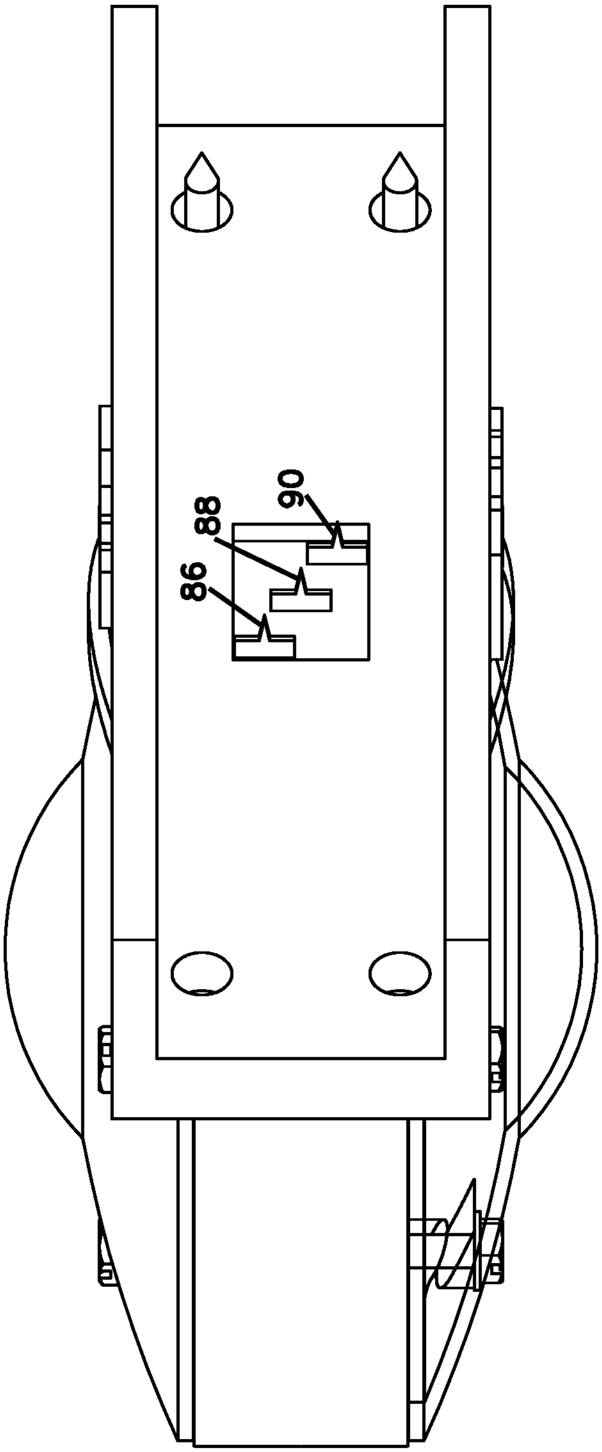
FIG. 14 is a bottom isometric view of the gate lamp of FIG. 12.
Figure 15:
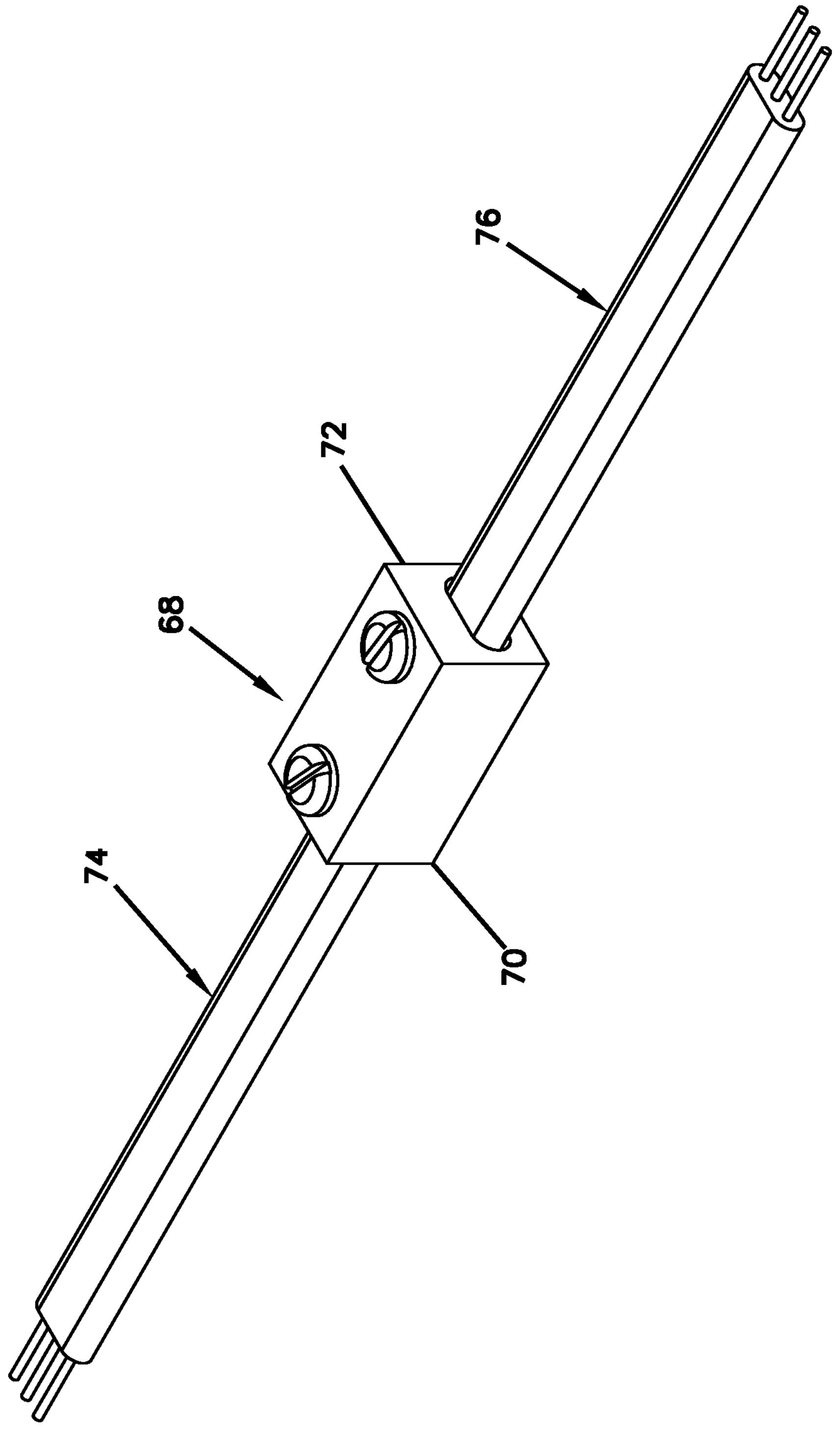
FIG. 15 is an isometric view of an inline connector connecting two flat cords according to the principles of the present disclosure.
Figure 16:
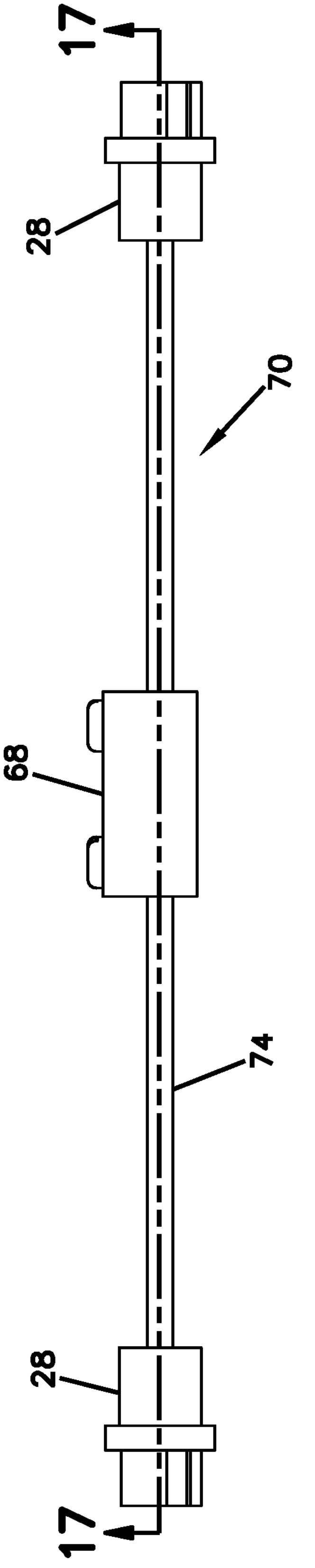
FIG. 16 is a side view of the inline connector connecting two assembled connectors and cord of FIG. 4.
Figure 17:
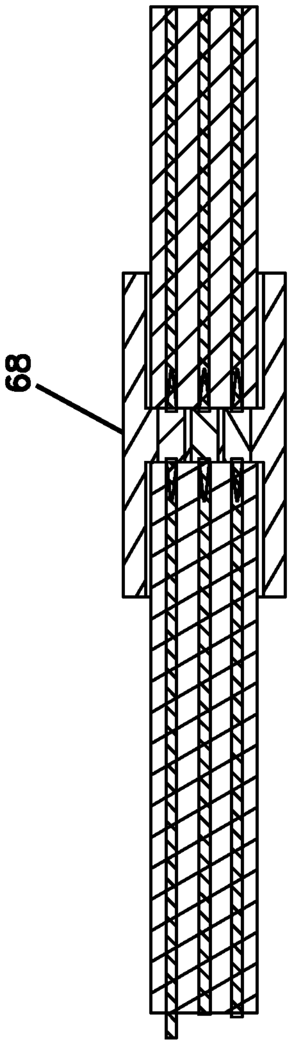
FIG. 17 is a cross sectional view of a portion of FIG. 16 along lines 17-17.
Figure 18:
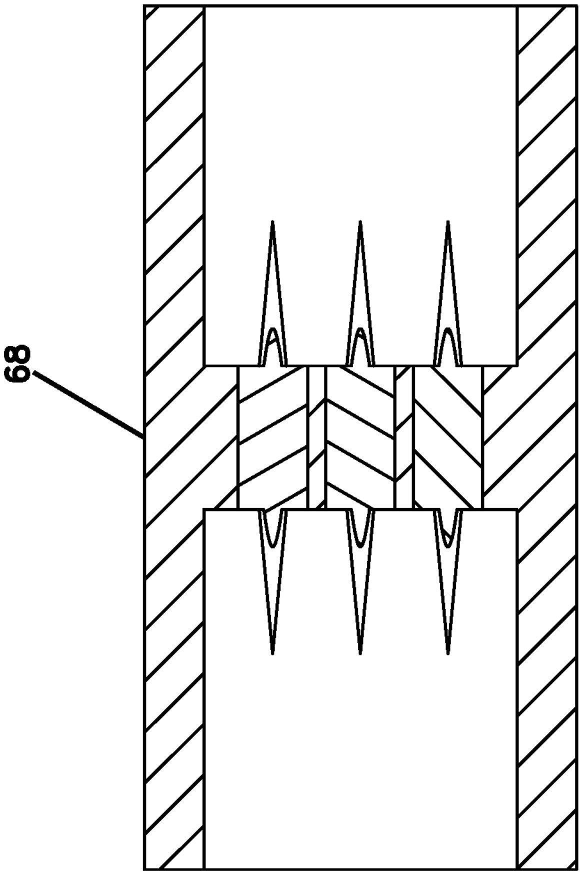
FIG. 18 is a cross sectional view of the inline connector of FIG. 15.

Referring to FIGS. 12-14, an alternative embodiment of a gate lamp system is shown. In the depicted embodiment, a gate lamp having an upper portion 80 includes a lamp and a lower portion 82 that is configured to be secured to a crossing gate arm 10. In the depicted embodiment, the upper portion 80 and the lower portion 82 define a through channel 84. In the depicted embodiment, the upper portion 80 includes spaced apart staggered conductive spears 86, 88, 90 that extend downwardly towards the lower portion 82. In the depicted embodiment, the electrical cord 92 extends through the gate lamp in the through channel 84. The conductive spears 86, 88, 90 are arranged and configured to pierce and make electrical connection with spaced apart longitudinal conductors within the electrical cord 92.

The present disclosure also provides a method of installing a gate lamp to a crossing gate arm comprising the steps of securing a gate lamp onto a crossing gate arm, connecting the gate arm to a power source by rotationally orientating a connector to a plug on the gate lamp, axially driving a flat cord into mechanical and electrical engagement with the connector, and securing the flat cord onto the crossing gate arm. It should be appreciated that the method can include more or less steps and that the steps can occur in a number of different sequences. In the depicted embodiment, the step of axially driving a flat cord into mechanical and electrical engagement with the connector occurs before the connector is electrically connected to the plug.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A lamp system for a railroad crossing gate, comprising:

an electrical cord having a body extending from a first end to a second end along a longitudinal axis defined by the electrical cord, the electrical cord including an electrical conductor within the body, an outer surface of the electrical cord having a flat top portion that is elongate parallel to the longitudinal axis and a flat bottom portion that is elongate parallel to the longitudinal axis; and a connector having a cylindrical body, the flat top portion and the flat bottom portion of the electrical cord being received in a recess of the cylindrical body of the connector such that the connector is connected to the cord at the first end, the connector being configured to electrically connect to a lamp configured to be secured to a crossing gate arm of the railroad crossing gate.

2. The system of claim 1, further comprising:

another connector having a cylindrical body, the another connector being connected to the cord at the second end, the another connector being configured to electrically connect to another lamp configured to be secured to the crossing gate arm.

3. The system of claim 1, wherein the electrical cord includes a plurality of electrical conductors extending longitudinally between the first end and the second end.

4. The system of claim 1, wherein the electrical cord includes three electrical conductors electrically insulated from one another and extending longitudinally between the first end and the second end, the three electrical conductors being arranged linearly in a row within the body of the cord.

5. The system of claim 4, wherein the electrical conductors are configured to deliver power and control signals to the lamp.

6. The system of claim 1, further comprising:

the lamp.

7. The system of claim 1, wherein the recess is a non-circular recess.

8. The system of claim 1, wherein the connector is a multi-position connector.

9. The system of claim 1, wherein the cylindrical body houses:

a plurality of spears including a first conductive spear, a second conductive spear, and a third conductive spear;

a plurality of conductive receptacles including a first conductive receptacle, a second conductive receptacle, and a third conductive receptacle; and a plurality of conductive bodies including a first conductive body connecting the first conductive receptacle and the first conductive spear, a second conductive body connecting the second conductive receptacle and the second conductive spear, and a third conductive body connecting the third conductive receptacle and the third conductive spear, wherein the conductive spears project from the conductive bodies in a first direction;

wherein the conductive receptacles project from the conductive bodies in a second direction that is different from the first direction;

wherein the conductive spears are arranged linearly in a row of the first conductive spear, the second conductive spear, and the third conductive spear; and wherein the conductive receptacles are not arranged linearly in a row of the first conductive receptacle, the second conductive receptacle, and the third conductive receptacle.

10. The system of claim 1, wherein the flat bottom portion defines a flat surface; and wherein the electrical cord is configured to connect to the lamp such that the flat surface is parallel to an upward facing surface of the crossing gate arm when the lamp is secured to the crossing gate arm.

11. A lamp system for a railroad crossing gate, comprising:

a connector for connecting an electrical cord to a gate lamp, the connector including:

a connector body, the connector body housing:

a plurality of spears including a first conductive spear, a second conductive spear, and a third conductive spear;

a plurality of conductive receptacles including a first conductive receptacle, a second conductive receptacle, and a third conductive receptacle; and a plurality of conductive bodies including a first conductive body connecting the first conductive receptacle and the first conductive spear, a second conductive body connecting the second conductive receptacle and the second conductive spear, and a third conductive body connecting the third conductive receptacle and the third conductive spear, wherein the conductive spears project from the conductive bodies in a first direction;

wherein the conductive receptacles project from the conductive bodies in a second direction that is different from the first direction;

wherein the conductive spears are arranged linearly in a row of the first conductive spear, the second conductive spear, and the third conductive spear; and wherein the conductive receptacles are not arranged linearly in a row of the first conductive receptacle, the second conductive receptacle, and the third conductive receptacle.

12. The system of claim 11, wherein the connector includes a non-circular recess configured to receive a flat cord.

13. The system of claim 11, wherein the connector is a multi-position connector.

* * * * *